(12) United States Patent
Grenning

(10) Patent No.: US 6,874,375 B1
(45) Date of Patent: Apr. 5, 2005

(54) PITOTLESS NOZZLE

(76) Inventor: Frederick H. Grenning, 1306 Crooked Willow La., Palatine, IL (US) 60067

( * ) Notice: Subject to any disclaimer, the term of this patent is extended or adjusted under 35 U.S.C. 154(b) by 0 days.

(21) Appl. No.: 10/410,489

(22) Filed: Apr. 8, 2003

(51) Int. Cl.⁷ .............................................. G01F 1/44
(52) U.S. Cl. .................................................. 73/861.63
(58) Field of Search ..................... 73/891.42, 861.52, 73/861.61, 861.63, 861.42

(56) References Cited

U.S. PATENT DOCUMENTS

| | | | |
|---|---|---|---|
| 2,564,272 A | | 8/1951 | Morton |
| 3,736,797 A | * | 6/1973 | Brown .................... 73/861.64 |
| 3,918,305 A | * | 11/1975 | Benedict ................... 73/861.61 |
| 4,343,193 A | | 8/1982 | Dawson et al. |
| 4,555,952 A | | 12/1985 | Jenkins |

* cited by examiner

*Primary Examiner*—Edward Lefkowitz
*Assistant Examiner*—Corey D. Mack
(74) *Attorney, Agent, or Firm*—Patula & Associates, P.C.

(57) ABSTRACT

A method and device for obtaining an accurate flow rate measurement through a fluid flow system. A nozzle and gauge tapping combination is connected to a fluid flow system. Fluid enters the nozzle as turbulent flow. As the fluid passes through the nozzle, the turbulent flow is converted to laminar flow due to the shape of the nozzle. Once in laminar flow, the pressure at that point in the nozzle is constant, and therefore the pressure, and thus flow rate, can be measured with greater accuracy.

7 Claims, 3 Drawing Sheets

PITOTLESS NOZZLE

The present invention relates generally to the field of flow rate measuring devices. More specifically, the present invention relates to a device for measuring differential pressure in order to determine the flow rate of a fluid through a nozzle attached to a fluid flow system.

BACKGROUND OF THE INVENTION

Devices are commonly installed in fluid flow systems to measure a differential in pressure across a piece of equipment. Based on the known characteristics of the equipment, the differential pressure can be converted into a flow rate.

A common device for measuring pressure is a pitot tube. The pitot tube is positioned at the outlet side of a nozzle to measure the pressure at a specific point of discharge. The opening of the pitot tube is placed in the stream of the fluid flow and positioned such that the tube is located in the exact center of the stream, one half of the nozzle outlet diameter away from the outlet of the nozzle and parallel to the flow path. Usually incorporated with the pitot tube is a gauge.

In a pitot tube, static pressure, which is atmospheric pressure in an open system, is compared to total pressure. Using Bernoulli's Equation, the pressure differential is then translated to a flow velocity. A gauge device may be graduated such that the readout is directly displayed as a velocity.

Pitot tubes are commonly used where there is a desire to determine the flow rates of fluids for equipment testing. Fire pumps, in addition to other pumping equipment, are required to meet certain specifications. Therefore, an accurate method of testing is important.

Many fire hydrant flow tests are conducted by taking a pitot reading directly from the nozzle on the fire hydrant. Due to inexact orifice diameter, excessive turbulence, which causes gauge bounce of +/-10 psi, and incorrect pitot positioning, these options give the least dependable readings.

Some devices integrate the pitot tube with the fluid flow piping. A general problem with pitot tubes is that they are difficult to position in the center of flow. To get an accurate reading, the pitot tube must be placed in the center of flow, in a position one half the nozzle outlet diameter away from the outlet of the nozzle, and parallel to the flow. The more removed from these requirements, the less accurate the measurement will be. Also, pitot tubes can easily be damaged by solids that may be intermixed with the fluid.

U.S. Pat. No. 4,555,952 to Jenkins, issued on Dec. 3, 1985, discloses a differential pressure sensor. The pressure sensor responds to pressure differential across an orifice of known size. Here, the fluid pressure is measured on one side of an orifice plate. The fluid flows through the orifice. The pressure is also measured on the other side of the orifice plate. The two pressures are compared across a diaphragm. The pressure differential is transmitted to an electronic transducer located a distance safe enough away to protect the transducer from the temperature of the fluid. Thus, the '952 patent requires an additional energy-consuming and turbulent-producing orifice plate device to measure pressure differential which can affect the accuracy of the measurement, while the present invention does not. The present invention compares the internal system pressure as the fluid passes through a constant pressure nozzle, which results in less turbulence, with the pressure of the atmosphere. The difference in pressure is translated into a flow rate for determining equipment performance.

U.S. Pat. No. 4,343,193 to Holden, issued on Aug. 10, 1982, discloses a flow measuring apparatus. The differential in pressure is measured across a removable orifice plate. When a reading is not required, the orifice plate can be removed from the system piping. Again, the present invention does not require an additional energy-consuming, turbulent-producing orifice plate device to measure pressure differential.

U.S. Pat. No. 2,564,272 to Morton, issued on Aug. 14, 1956, discloses a flow meter attachment for hose nozzles. The nozzle is accompanied with a gauge tapping for a pressure gauge. The attachment consists of two tubular sections. The inner tubular section has a plurality of holes which extends through the wall such that there is fluid communication between the inside and outside of the inner tubular section. The gauge measures the pressure differential between the two tubular sections and the atmosphere. However, this does not allow for full measurement of the velocity component of Bernoulli's Equation since there is diminished flow in between the two tubular sections, thereby resulting in a less accurate reading over the present invention. In addition, the '272 patent requires that the characteristics of the nozzle be known, such that the pressure gauge can be calibrated directly in fluid flow. However, the present invention uses a constant pressure design nozzle which provides a more accurate gauge reading. Also, a constant pressure nozzle produces negligible turbulence, thereby providing for nearly perfect laminar flow. Hence the resulting flow will result in less needle bounce and a constant steady readout of pressure as measured by a gauge.

The present invention provides a more accurate reading of fluid flow through the use of a pressure gauge in conjunction with a constant pressure nozzle of known characteristics, wherein the measuring gauge does not interfere with the dynamic profile of the fluid flow.

OBJECTS OF THE INVENTION

An object of the present invention is to utilize a fluid flow nozzle in combination with a pressure gauge, wherein the fluid flow nozzle and pressure gauge combination does not contribute to energy loss pressure drops, nor causes turbulent flow in the area of measurement when determining fluid flow.

Another object of the invention is to provide a device wherein the pressure gauge is not easily damaged by any solids in the system.

Yet another object of the invention is to provide a more accurate measuring system for measuring pressure drop, hence fluid flow, by using a constant pressure drop nozzle of known characteristics in conjunction with a pressure gauge.

Yet another object of the invention is to provide a device which can be directly connected to a hydrant nozzle or to certain flow diffusing devices.

Numerous other objects, features and advantages of the present invention will become readily apparent through the detailed description of the preferred embodiment, drawings and the claims.

SUMMARY OF THE INVENTION

The present invention is a device for obtaining a more accurate measurement of fluid flow in an open system. The preferred embodiment is one where a gauge tapping is combined with a constant pressure nozzle.

In the preferred embodiment, a constant pressure nozzle is provided with a gauge tapping for a pressure gauge. Although not required for this invention, a pressure gauge can be attached to the gauge tapping. The readout from the pressure gauge can be calibrated in pressure or flow rate based on the characteristics of the nozzle.

The constant pressure nozzle may be manufactured to fit various types of connections, such as threaded, soldered, and quick connect/disconnect, as may be required by the user.

Fluid flowing through the system will pass through the constant pressure nozzle and gauge tapping combination. Because the constant pressure nozzle provides a more uniform flow profile, there will be less turbulent flow in the nozzle. The result of less turbulence in the constant pressure nozzle is a constant pressure at the gauge tapping. With a constant pressure at the gauge tapping, a person reading a gauge will read the gauge with greater accuracy because there will be less gauge bounce.

Any attached measuring gauge will measure the system pressure relative to atmospheric pressure. With known characteristics of the constant pressure nozzle, the measured pressure can be translated into a flow rate. The flow rate can be graduated and labeled directly on the pressure measuring gauge.

DESCRIPTION OF THE DRAWINGS

A preferred embodiment of the present invention is described herein with reference to the drawing wherein.

DETAILED DESCRIPTION OF THE PREFERRED EMBODIMENT

Figure 1:
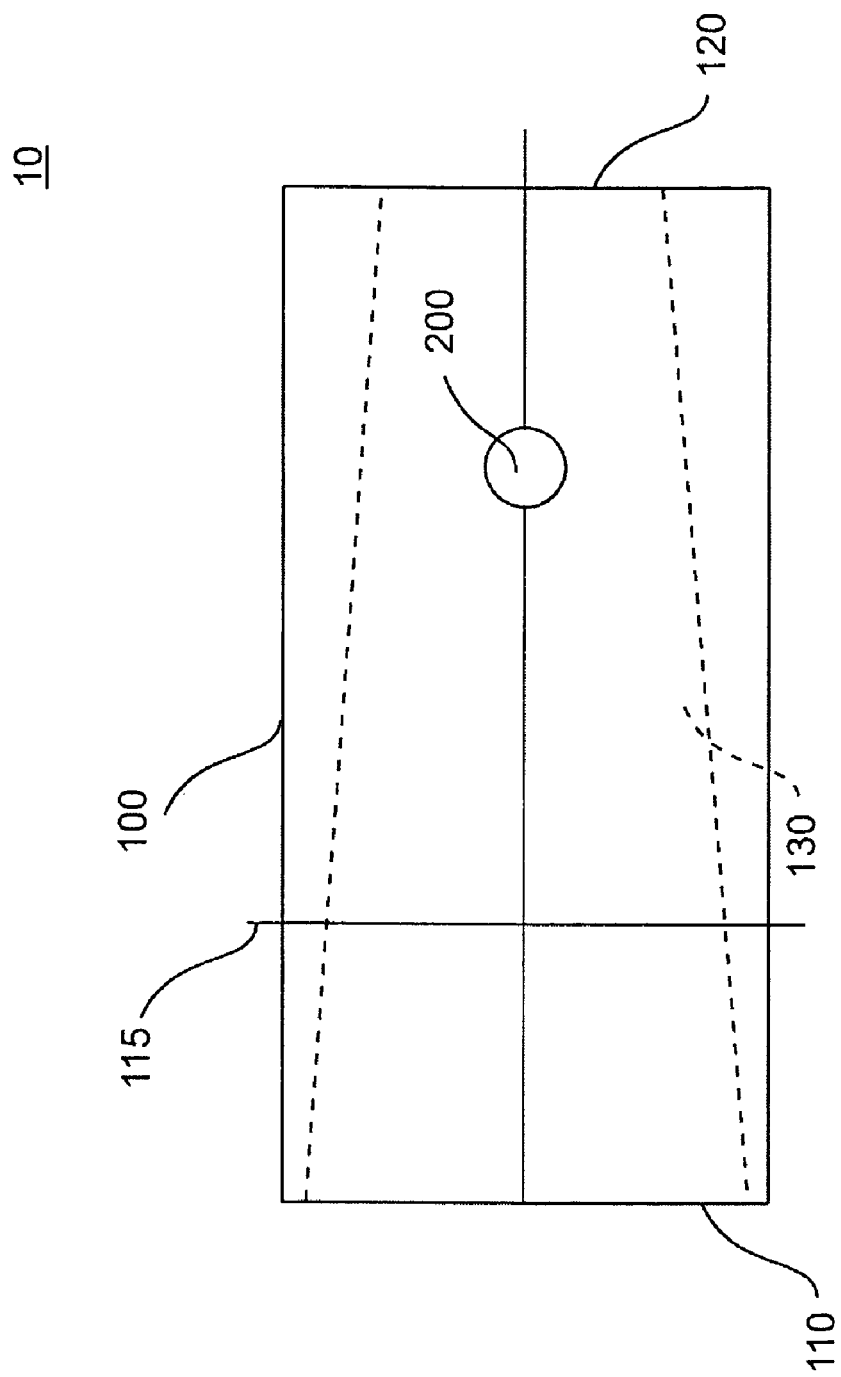
FIG. 1 is a cross-sectional view of the constant pressure nozzle and gauge tapping combination.

While the invention is susceptible of various modifications and alternative constructions, certain illustrated embodiments shown in the drawings will be described below in detail. It should be understood, however, that there is no intention to limit the invention to the specific forms disclosed, but on the contrary, the invention is to cover all modifications, alternatives constructions and equivalents falling within the spirit and scope of the invention.

Referring to FIG. 1, a preferred embodiment of the present invention 10 contains a constant pressure nozzle 100, and a gauge tapping 200. The constant pressure nozzle 100 comprises a nozzle inlet 110, a nozzle connection 115, a nozzle outlet 120, and a tapered chamber 130. The nozzle inlet 110 can accept fluid from any fluid source that provides fluid in the same cross-sectional area as nozzle inlet 110. In addition, the nozzle inlet may be connected to a source of fluid by attaching the nozzle inlet 100 to a fluid containing vessel. The nozzle connection 115 may be any standard of connection, such as, threaded, welded, soldered and locking quick-connect. The nozzle outlet 120 provides for exit of the fluid. The fluid exiting from the nozzle outlet 120 may enter into another vessel or be released to the environment. The tapered chamber 130 is shaped such that the tapered chamber 130 provides a nearly laminar flow of fluid within the tapered chamber 130, resulting in a measured constant pressure through-out the tapered chamber 130 minimally affected by film coefficient, friction, random currents and other disruptions that may induce turbulent flow.

Figure 2:
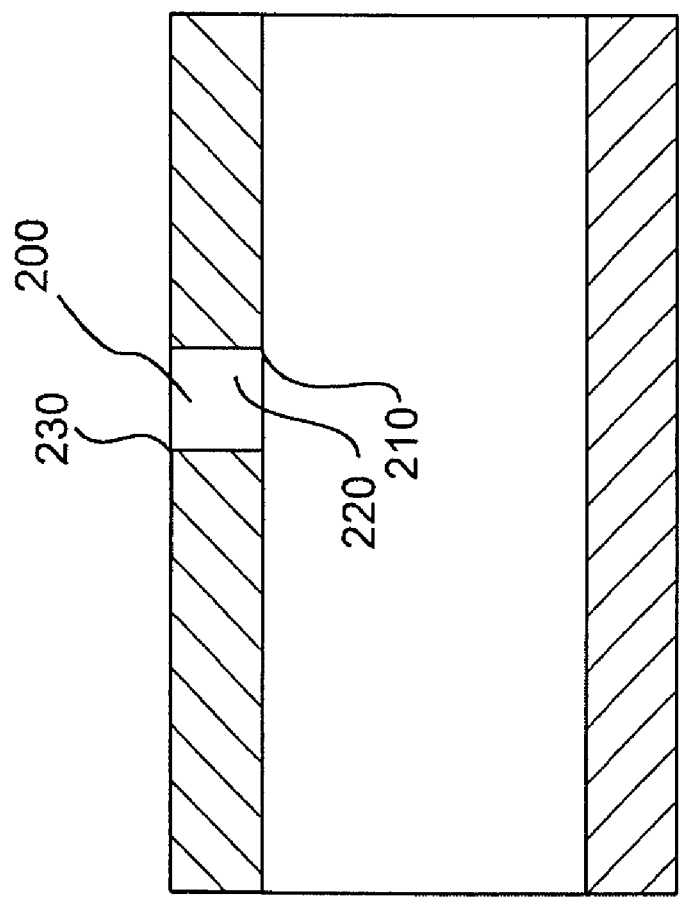
FIG. 2 is a cross-sectional view of the gauge tapping.

Referring to FIG. 2, the gauge tapping 200 comprises a nozzle side inlet 210, a gauge connection 220, and a pressure translating tube 230. The nozzle side inlet 210 opens to the tapered chamber 130 without entering the tapered chamber 130 or obstructing the flow of the fluid in the tapered chamber 130 such that introduction of turbulent flow is minimized. The gauge connection 220 provides a connection where a gauge can be mounted on the constant pressure nozzle 100. The gauge connection 220 need not be limited to a threaded type of connection, but may be any type of leak resistance connection where a gauge can be attached with out leakage of fluids based on the maximum testing pressure expected during operation. The pressure translating tube 230 allows for free communication of pressure between the nozzle side inlet 210 and the gauge connection 220, wherein an accurate pressure reading unaffected by differing velocities can be obtained Referring to FIG. 3, The tapered chamber 130 converts the fluid from turbulent flow 300 at the nozzle inlet 110 to nearly laminar flow 310 as the fluid passes the gauge tapping 200.

In operation, the invention 10 is connected at the nozzle connection 115 to a fluid flow system where an accurate measurement of a flow rate of the system is desired. When the measurement of flow rate of the system is required, an operator will open a valve in the system that will permit the flow of fluid through invention 10 by either system pressure or by energizing a pump upstream of the invention 10. Fluid will then flow through the system to the invention 10.

Figure 3:
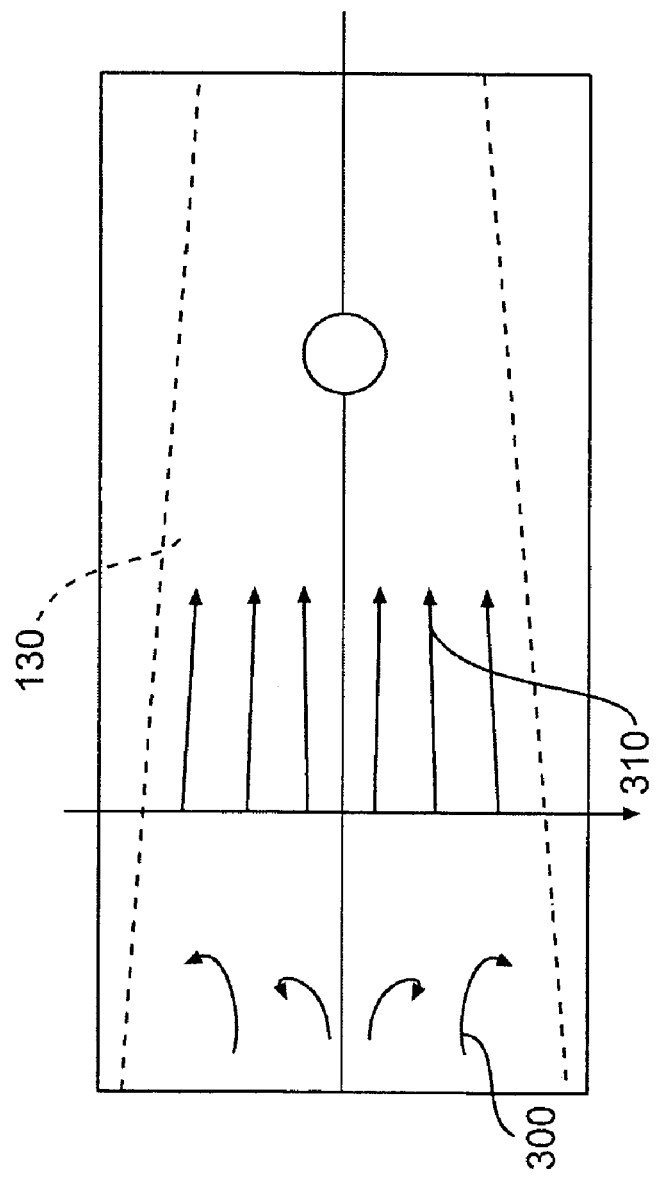
FIG. 3 is a fluid flow profile of the fluid as it passes through the constant pressure nozzle.

Fluid enters the invention 10 through the nozzle inlet 110 of the constant pressure nozzle 100. From the inlet 110, the fluid enters the tapered chamber 130. As illustrated in FIG. 3, as the fluid enters the tapered chamber 130, it enters as turbulent flow 300. Because of the shape and characteristics of the tapered chamber 130, the flow is converted from turbulent flow 300 to laminar flow 310, thereby, creating a constant pressure flow profile within the tapered chamber 130. Thus the fluid flow velocity profile changes from turbulent flow 300 to nearly laminar flow 310 proximate the gauge tapping 200.

The fluid then flows past the gauge tapping 200. At the gauge tapping 200, the pressure inside the tapered chamber 130 is greater than the pressure at the gauge tapping 200, therefore, via the fluid, a positive pressure is exerted on the gauge tapping 200. Pressure, via the fluid, enters the gauge tapping 200 at the nozzle side inlet 210. The pressure is then translated through the pressure translating tube 230 from the nozzle side inlet 210 to the gauge connection 220. Where a gauge is connected, the system pressure is translated from to the gauge connection 220 to the gauge.

The fluid in the tapered chamber 130 continues past the gauge tapping 200 through the remainder of the tapered chamber 130. At the end of the tapered chamber 130, the fluid exits the constant pressure nozzle 100 through the nozzle outlet 120.

It is to be understood that the embodiment(s) herein described is/are merely illustrative of the principles of the present invention. Various modifications may be made by those skilled in the art without departing from the spirit or scope from the claims which follow.

What is claimed is:

1. A method for fluid flow measurement, comprising the steps of:

attaching a constant pressure nozzle having a tapered chamber with a single gauge tapping to a fluid flow system;

flowing fluid through the constant pressure nozzle having the tapered chamber with the single gauge tapping;

converting said flowing fluid from turbulent flow to laminar flow in the tapered chamber so as to create a measured constant pressure through-out the tapered chamber;

taking a measurement of the constant pressure of said laminar flow via the single gauge tapping; and comparing the measurement of the constant pressure with atmospheric pressure.

2. The method of claim 1, further comprising the step of:

converting said pressure measurement into a fluid flow rate.

3. A device for fluid flow measurement, comprising:

a constant pressure nozzle for receiving a fluid flow from a fluid flow system, the constant pressure nozzle including a tapered chamber having a nozzle inlet and a nozzle outlet and;

a single gauge tapping in said constant pressure nozzle for measuring said fluid flow by comparing internal system pressure as fluid flows through the constant pressure nozzle with atmospheric pressure;

wherein the tapered chamber of said constant pressure nozzle is shaped such that it converts said fluid flow from turbulent flow to laminate flow resulting in a measured constant pressure through-out the tapered chamber, and said gauge tapping provides for measurement of the constant pressure of said laminar flow.

4. The device of claim 3, further comprising a pressure gauge, connected to the gauge tapping, for displaying the measurement.

5. The device of claim 4, wherein the pressure gauge is graduated to convert to flow rate.

6. The device of claim 4, wherein the pressure gauge does not interfere with the fluid flow.

7. The device of claim 3, wherein the single gauge tapping has a gauge connection, a pressure translating tube, and a nozzle side inlet which opens to the tapered chamber without entering the tapered chamber and without obstructing fluid flow.

* * * * *

UNITED STATES PATENT AND TRADEMARK OFFICE
CERTIFICATE OF CORRECTION

PATENT NO. : 6,874,375 B1  Page 1 of 1
APPLICATION NO. : 10/410489
DATED : April 5, 2005
INVENTOR(S) : Grenning It is certified that error appears in the above-identified patent and that said Letters Patent is hereby corrected as shown below:

In column 3, line 28, please replace the words "cross-sectional" with the word -- plan -- so as to read:

-- FIG. 1 is a plan view of the constant pressure --

In column 3, line 54, please replace "100" with -- 110 -- so as to read:

-- fluid by attaching the nozzle inlet 110 to a fluid containing --

Signed and Sealed this

Twenty-ninth Day of May, 2007

JON W. DUDAS
*Director of the United States Patent and Trademark Office*